United States Patent
Wu et al.

(10) Patent No.: US 12,036,651 B2
(45) Date of Patent: Jul. 16, 2024

(54) NAIL DRIVE METHOD OF ELECTRIC NAIL GUN

(71) Applicant: De Poan Pneumatic Corp., New Taipei (TW)

(72) Inventors: I-Tsung Wu, New Taipei (TW); Chia-Sheng Liang, New Taipei (TW); Zhen-Liang Liao, New Taipei (TW); Wen-Chin Chen, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 28 days.

(21) Appl. No.: 17/979,720

(22) Filed: Nov. 2, 2022

(65) Prior Publication Data

US 2023/0182276 A1    Jun. 15, 2023

(30) Foreign Application Priority Data

Dec. 15, 2021 (TW) ................................ 110147010

(51) Int. Cl.
| | |
|---|---|
| *B25C 1/06* | (2006.01) |
| *B25C 1/00* | (2006.01) |
| *H02J 7/00* | (2006.01) |
| *H02P 7/29* | (2016.01) |
| *H02P 7/292* | (2016.01) |

(52) U.S. Cl.
CPC .............. *B25C 1/06* (2013.01); *H02J 7/0063* (2013.01); *H02P 7/29* (2013.01); *H02P 7/292* (2013.01); *B25C 1/008* (2013.01)

(58) Field of Classification Search
CPC .......... B25C 1/06; B25C 1/008; H02J 7/0063; H02P 7/29; H02P 7/292
See application file for complete search history.

(56) References Cited

U.S. PATENT DOCUMENTS

| | | | |
|---|---|---|---|
| 2009/0285655 A1* | 11/2009 | Gardner .............. | F16B 15/0092 411/469 |
| 2010/0065294 A1* | 3/2010 | Hirabayashi .............. | B25C 1/06 173/122 |
| 2017/0070168 A1* | 3/2017 | Takano ................... | H02P 27/08 |

* cited by examiner

*Primary Examiner* — Veronica Martin
(74) *Attorney, Agent, or Firm* — Chun-Ming Shih; HDLS IPR SERVICES

(57) ABSTRACT

A nail drive method applied in an electric nail gun, in which a rotary actuator is driven to generate forward rotational kinetic energy for nailing. The rotary actuator has paired wire bundles and magnetic lines arranged in circumferential directions. The nail drive method comprises boosting a pre-loaded voltage of a battery to generate a peak voltage, and storing the electric charge generated by the peak voltage, and then releasing the peak voltage and its electric charge to the rotary actuator through a nailing signal, so that the wire bundles can generate a current to interact with the magnetic lines to generate a tangential force, so that the magnetic lines can drive the rotor to rotate for a specific angle, and the rotary actuator can directly generate a forward rotational kinetic energy for nailing. Thus, the energy conversion structure installed in the conventional electric nail gun can be omitted.

10 Claims, 13 Drawing Sheets

NAIL DRIVE METHOD OF ELECTRIC NAIL GUN

BACKGROUND OF INVENTION

1. Field of the Invention

The present invention relates to an electric nail gun, particularly to a technology that uses a DC motor to output kinetic energy for nailing by spinning for a specific rotation angle, and more particularly to a nail drive method applied in an electric nail gun.

2. Description of Related Art

Nail guns can be categorized into two types: pneumatic nail guns and electric nail guns. Generally speaking, both of these two types of nail guns require sufficient kinetic energy to drive the nail-shooting rod to move downward at a sufficiently high linear speed to press the nail into the object to be nailed.

Regardless of the type of power source the nail gun uses, when the nail-shooting rod moves upward to be reset, the kinetic energy does not need to be so high to generate a linear speed similar to that during the downward motion. In other words, after the nail-shooting rod moves downward and shoots the nail, only a low kinetic energy to generate a linear speed lower than the nailing speed is needed to overcome the weight load of the nail-shooting rod and bring the nail-shooting rod upward to return to the original position, so as to satisfy the basic requirement for reciprocated movement of the nail-shooting rod for repeated nailing actions. Therefore, regardless of the power source used by the nail gun, the requirement of the kinetic energy to drive the nail-shooting rod to move downward for nailing is pivotal for the quality of nailing.

In order to meet the requirement for the kinetic energy to move the nail-shooting rod downward for shooting, the existing pneumatic nail gun uses the characteristics of the air that can be compressed to accumulate pressure to drive the piston inside a cylinder to move the nail-shooting rod to reach a linear speed sufficient for nailing. Moreover, the piston can also be driven inversely by the high-pressure air to move backward and bring the nail-shooting rod to move upward to be reset. Specifically, the required pressure for upward motion of the nail-shooting rod is far less than the required pressure for downward motion of the nail-shooting rod to shoot the nail.

Unlike the pneumatic nail gun, the existing electric nail gun uses a battery configured inside the gun body to provide DC electric power to drive the electric motor to generate a rotational kinetic energy, and uses an energy conversion structure to output sufficient kinetic energy for the nail-shooting rod to move downward for nailing. Specifically, the rotational kinetic energy is used in two driving modes:

One mode is to use the rotational kinetic energy generated by the electric motor to drive the nail-shooting rod to move downward for shooting. In this mode, the electric nail gun relies on a flywheel to accumulate the rotational kinetic energy generated by the electric motor. During the instant contact between the flywheel and the slide seat configured with a nail-shooting rod, the rotational kinetic energy accumulated by the flywheel is instantly transmitted to the slide seat, driving the nail-shooting rod on the slide seat to instantly output a huge linear force to meet the requirement of kinetic energy to move the nail-shooting rod downward for nailing. Further, the electric nail gun in this mode also relies on a reset spring. During the downward motion of the nail-shooting rod, the reset spring will be driven to accumulate a spring force or elastic potential energy, to drive the nail-shooting rod to move upward to be reset. Specifically, the elastic potential energy accumulated by the reset spring is far less than the kinetic energy required to move the nail-shooting rod downward for nailing. Therefore, the energy conversion structure made up of the electric motor and the flywheel is pivotal for the electric nail gun to generate the kinetic energy for nailing. However, the shortcoming is obvious. The energy conversion structure made up of the electric motor and the flywheel is complicated. It occupies too much space and make the nail gun too heavy.

The other mode is to use the mechanical energy generated by the electric motor to drive the nail-shooting rod to move upward to be reset. The electric nail gun in this mode relies on a nailing spring. During the upward motion of the nail-shooting rod to be reset, the nailing spring can accumulate a spring force or an elastic potential energy to drive the nail-shooting rod to move downward, and meet the requirement of kinetic energy for the nail-shooting rod to move downward for nailing. Specifically, when the electric motor drives the nail-shooting rod to move upward to be reset, the energy accumulated after overcoming the mechanical loss must meet the requirement of kinetic energy for the nailing spring to drive the nail-shooting rod to move downward for nailing. In other words, the elastic potential energy generated by the nailing spring must satisfy the requirement of kinetic energy for nailing. Therefore, the length and elasticity of the nailing spring should be increased. As a result, the energy conversion structure made up of the electric motor and the nailing spring is also complicated. It still occupies a large space and makes the weight of the gun body too heavy.

Moreover, although the prior-art techniques use an electric motor to output a forward or backward rotation at a preset angle, and use voltage boosting of the electric power supplied to the electric motor to increase the rotational kinetic energy output, it is to be noted that, till now, such techniques have not been applied to electric nail guns because the driving technique of existing motors still cannot meet the requirement of kinetic energy for nailing.

SUMMARY OF THE INVENTION

Regarding the technique of the aforesaid prior art, the inventor of the present invention believes that the prior art did not fully utilize the principle of electromagnetic induction of the motor to develop an electric motor driving technique that can produce sufficient kinetic energy required by the electric nail gun for nailing. That is the reason why the nail gun is big and heavy.

In view of this, based on the principle of electromagnetic induction, the present invention developed a rotary actuator that can be installed in an electric nail gun to replace the electric motor loaded in the existing electric nail gun. The rotary actuator comprises a fixed stator and a rotor pivoted around the stator (i.e., in circumferential direction). The periphery of the stator is formed with multiple paired wire bundles made by winding serially connected wires. The inner wall of the rotor is fixed with multiple paired magnetic plates. The wire bundles and the magnetic plates are corresponding to each other pair by pair. Each of the magnetic plates can generate a magnetic line bundle.

Based on the above basic structure of the rotary actuator, the present invention has developed a driving method for the electric nail gun. Through this method, the rotary actuator can output a forward rotational kinetic energy that can meet the required kinetic energy. Thus, the present invention can replace the electric motor and its complicated energy conversion structure in the existing electric nail gun.

In a preferred embodiment, the nail drive method provided in the present invention comprises: boosting a pre-loaded voltage of a battery to generate a peak voltage, storing the electric charge generated by the peak voltage, and then releasing the peak voltage and its electric charge to the rotary actuator via a nailing signal, so that the wire bundles can generate a current to interact with the magnetic lines to generate a tangential force. Thus, the magnetic lines can drive the rotor to rotate for a specific angle, and generate a forward rotational kinetic energy. Specifically, the peak voltage satisfies the following inequation:

$$V_{max} > (V_s + V_c)$$

where, $V_{max}$ is the peak voltage, $V_s$ is the basic voltage required by the energy storage element to release electric charge during power-on time, and $V_c$ is terminal voltage; wherein, $$V_c > V_b + I_e R$$

where, $V_b$ is the back electromotive force generated by the wire bundles rotated by the magnetic lines, $I_e$ is terminal current, R is terminal resistance generated by the wire bundles.

In a further embodiment, the tangential force is represented by Eq. (1), the back electromotive force is represented by Eq. (2), and the forward rotational kinetic energy is represented by Eq. (3):

$$F = B \times L \times I \quad (1)$$
$$V = B \times L \times v \quad (2)$$
$$E = \frac{1}{2} J \omega^2 \quad (3)$$

where, F is the tangential force, B is the magnetic flux density of the magnetic lines, L is the total length of the serially connected wire, I is the current generated by the total electric charge released by the peak voltage to the wire bundles during the nailing action time, V is the back electromotive force, v is the speed caused by F, E is the forward rotational kinetic energy, J is the moment of inertia generated by the rotor, and ω is the angular speed generated by the rotor.

In a further embodiment, the peak voltage releasing process has a nailing action time. The current has an initial current during the initial period of the nailing action time. The current has a terminal current at the end of the nailing action time. The initial current is firstly increased and then decreased to the terminal current along with the progress of the nailing action time.

In a further embodiment, the pre-loaded battery is electrically connected to an energy storage element via a voltage boost circuit. The peak voltage is generated by the voltage boost circuit, and the electric charge that generates the peak voltage is stored by the energy storage element. The nailing signal is generated by a trigger switch that actuates the electric nail gun, the trigger switch controls the timing for the peak voltage and its electric charge to be released to the rotary actuator via the energy storage element.

In a further embodiment, the peak voltage has a terminal voltage at the end of the nailing action time, and the terminal voltage and terminal current satisfy the following inequation:

$$\frac{(V_c - V_e)}{R} > I_e > 0$$

wherein, $V_c$ is the terminal voltage, $V_e$ is the back electromotive force at the end of the nailing action time, $I_e$ is the terminal current, and R is the terminal resistance generated by the wire bundles.

In a further embodiment, the method further comprises providing a backward current via the terminal voltage to drive the rotary actuator to generate a backward rotational kinetic energy after generating the forward rotational kinetic energy. In addition, the backward current can also be provided by a battery. Or, a potential energy generated by a reset spring can close the specific rotation angle, instead of driving the rotary actuator to generate a backward rotational kinetic energy.

Based on the above implementation, the present invention can achieve the following technical functions:

By means of boosting the voltage of the pre-loaded battery, the rotary actuator can be driven to generate a forward rotational kinetic energy at a specific rotation angle, so that the forward rotational kinetic energy at a specific rotation angle can be applied in the nail gun as the power source to drive the nail-shooting rod to move downward for nailing. Thus, the complicated structure of the electric nail gun can be simplified (i.e., there's no need to configure the complicated energy conversion structure beside the motor).

Furthermore, in order to adapt to different requirements for the nailing force to shoot different nails or in different nailing occasions, the present invention can use the energy storage element (such as a capacitor) to store the peak voltage in a controllable manner, so as to generate an appropriate forward rotational kinetic energy to meet the nailing requirement.

Furthermore, as the initial current generated by the peak voltage can firstly be increased and then decreased to the terminal current along with the progress of the nailing action time, the present invention can ensure sufficient kinetic energy during the nailing process, and thus the nailing quality can be improved.

Therefore, the method of implementation and drawings are provided below to prove the feasibility of the present invention and the practicability of its technical functions.

DETAILED DESCRIPTION OF THE INVENTION

Figure 1:
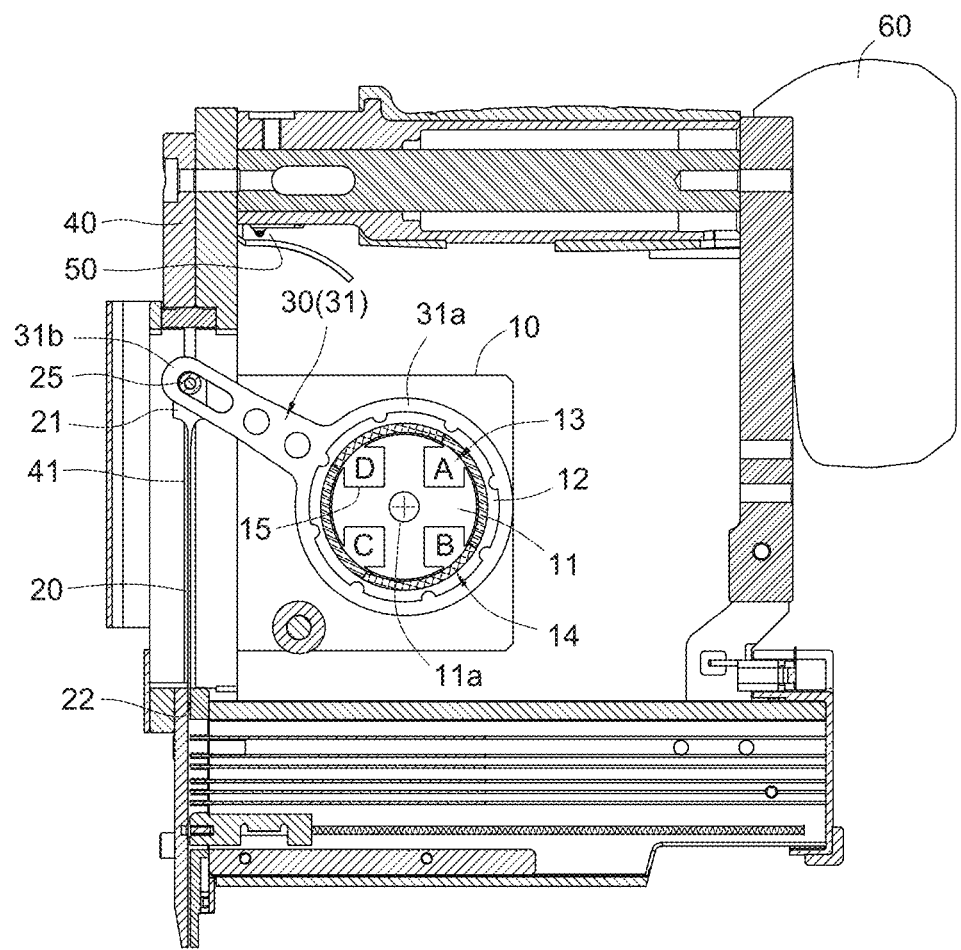
FIG. 1 is a sectional view of a preferred embodiment of the electric nail gun according to the present invention.

In order to clearly illustrate the nail drive method thereof for an electric nail gun, now please firstly refer to FIG. 1, which discloses an electric nail gun to implement the method thereof. Its machine body 40 is configured with a battery 60, a trigger switch 50, a nail-shooting rod 20 and a rotary actuator 10. Furthermore, the trigger switch 50 is configured on one side of the gripping part of the machine body 40, so that the user can press it to actuate the nail gun to shoot a nail. The two ends of the nail-shooting rod 20 are respectively formed with a transmission part 21 for connection to the power source and a striking part 22 to shoot the nail. One side of the machine body 40 is configured with a guiding groove 41 arranged in the nailing axial direction, to fit the nail-shooting rod 20 in a sliding manner, so that the nail-shooting rod 20 can have reciprocating motion inside the guiding groove 41 to move downward for nailing and upward to be reset along the nailing axial direction. Based on this, the present invention can use the rotary actuator 10 to output a forward rotational kinetic energy (to be detailed later) to drive the nail-shooting rod 20 to move downward for nailing. The present invention can also use the rotary actuator 10 to output a backward rotational kinetic energy (to be detailed later) or use a reset spring 43 (see FIG. 7) to provide an elastic potential energy to drive the nail-shooting rod 20 to move upward to be reset.

As shown in FIG. 1, the rotary actuator 10 is basically a DC motor or engine that can output a specific rotation angle and that comprises a stator 11, a rotor 12 and even numbers of paired electromagnetic mutual action component 13, 14.

Figure 2:
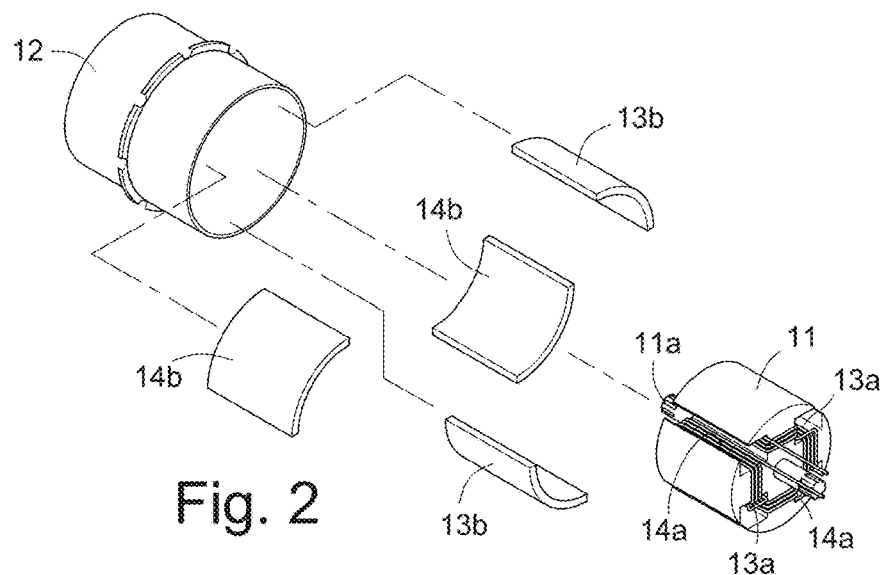
FIG. 2 is an exploded perspective view of the electromagnetic mutual action component configured between the stator and the rotor in FIG. 1.

Referring collectively to FIG. 1 and FIG. 2, the stator 11 is made by stacking steel plates into a column with an outer surface of equal circumference. The two ends of the stator 11 is formed with a positioning column 11a, so that the stator 11 can be fixed stably inside the main body of the rotary actuator 10 via a positioning column 11a. The rotor 12 is made into a ring shape, and is pivoted around the stator 11, capable of rotation concentrically. The even numbers of electromagnetic mutual action components 13, 14 are arranged into pairs, and are distributed between the outer surface of the stator 11 and the inner surface of the rotor 12 in the circumferential direction at intervals.

Now please refer collectively to FIG. 2, FIG. 2a to FIG. 2d, and FIG. 3, which disclose a preferred embodiment of the even numbers of electromagnetic mutual action components 13, 14. As shown, the even numbers of electromagnetic mutual action components configured between the stator 11 and the rotor 12 are basically four groups: A, B, C, D, and each group of electromagnetic mutual action components respectively has a wire bundle and a magnetic plate configured in a pair. Group A and Group C of the electromagnetic mutual action components respectively have paired first wire bundles 13a and first magnetic plates 13b, and Group B and Group D of the electromagnetic mutual action components respectively have paired second wire bundles 14a and paired second magnetic plates 14b, forming four wire bundles and four magnetic plates arranged in pairs.

Figure 2A:
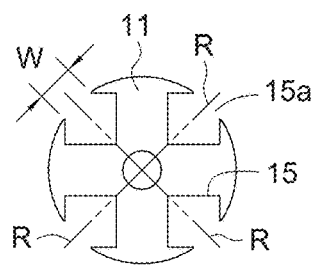
FIG. 2a is a schematic view of the stator structure in FIG. 2.
Figure 3:
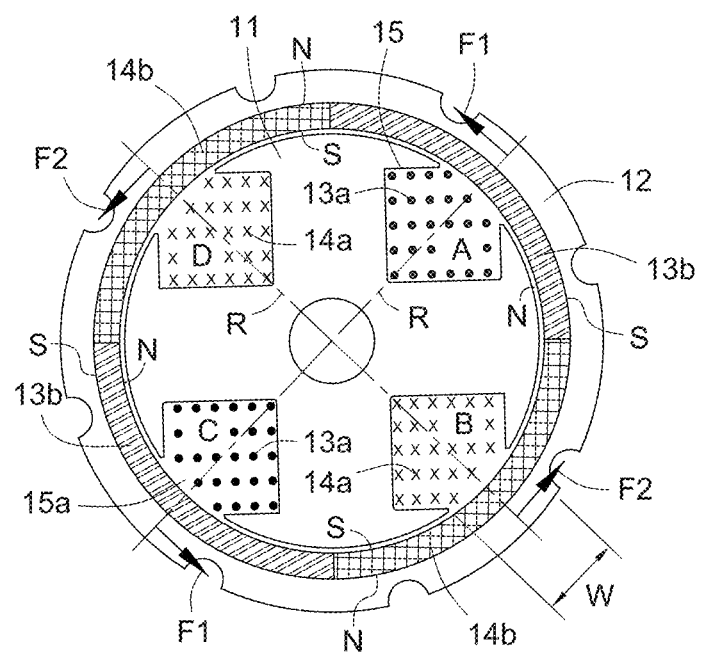
FIG. 3 is a configuration diagram of the electromagnetic mutual action component in FIG. 1 driving the rotor to spin.

Specifically, as shown in FIG. 3, the stator 11 has four normal lines R pointing from the center outward along the circumferential direction, forming 90 degree angles between each other, and the outer surface of the stator 11 can be configured with wire collecting grooves 15 respectively along the four normal lines R, so that the four wire collecting grooves 15 are distributed around the stator 11 in the circumferential direction at even intervals, and each wire collecting groove 15 has an open groove end 15a formed in the direction of the normal line R of the stator 11. The open groove ends 15a respectively have a groove end width W (see FIG. 2a). The magnetic plates 13b, 14b are made of permanent magnets into curved plates and are respectively fixed on the inner wall of the rotor 12.

Figure 2B:
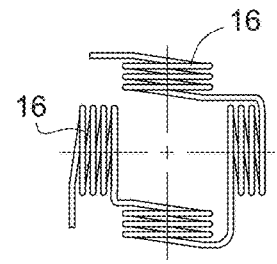
FIG. 2b is a schematic view of the coil structure in FIG. 2.

Specifically, as shown in FIG. 2b, in the present embodiment, a single wire is wound into four bundles of coils 16 to form a coil group. The wire can be enameled wire. Thus, as disclosed in FIG. 3, the first wire bundles 13a in Groups A and C of the electromagnetic mutual action components, and the second wire bundles 14a in Groups B and D of the electromagnetic mutual action components are respectively formed by part of the two coils 16 shown in FIG. 2b. In other words, the two neighboring wire collecting grooves 15 disclosed in FIG. 2a provide space for a coil 16 to be implanted from the groove end 15a and be wound, so that each wire collecting groove 15 can hold part of the wires of two bundles of coils 16 at the same time, forming wire bundles in each of the wire collecting grooves (see FIG. 1, FIG. 2).

Figure 2C:
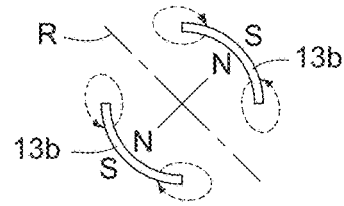
FIG. 2c is a schematic view of the first magnetic plates of Group A and C of the electromagnetic mutual action components in FIG. 2.

Specifically, as shown in FIG. 2c, two first magnetic plates 13b are arranged opposite each other along their respective normal lines R, and the inner surfaces of both are N pole, the outer surfaces of both are S pole, respectively providing emitting magnetic lines (indicated by dotted lines in FIG. 2c) to the aforesaid first wire bundles 13a. That means, the magnetic lines of the two first magnetic plates 13b spread from the inner surface toward the outer surface.

Figure 2D:
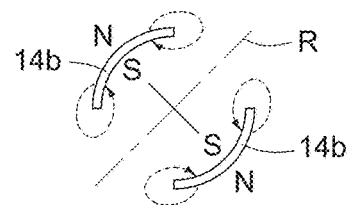
FIG. 2d is a schematic view of the second magnetic plates of Group B and D of the electromagnetic mutual action components in FIG. 2.

Furthermore, as shown in FIG. 2d, the two second magnetic plates 14b are not only in opposite distributions along their respective normal lines R, but also distributed correspondingly with the two first magnetic plates 13b in the above FIG. 2c at intervals. Both of the two second magnetic plates 14b have their outer surfaces as N pole, and inner surface as S pole, so as to provide the above second wire bundles 14a with emitting magnetic lines (indicated by dotted lines in FIG. 2d). That is to say, the magnetic lines of the two second magnetic plates 14b spread from the outer surface toward the inner surface. Based on such a structure, the two neighboring first magnetic plates 13b and second magnetic plates 14b respectively generate magnetic lines of opposite polarity (see FIG. 3).

Figure 2E:
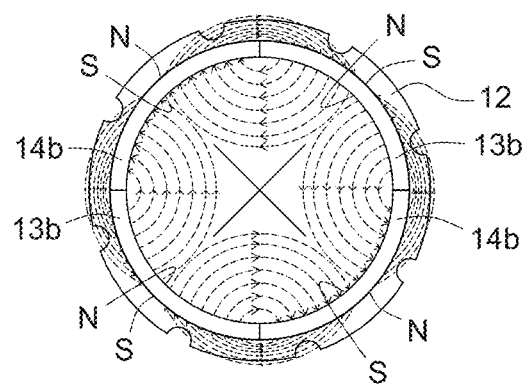
FIG. 2e is a schematic view of the magnetic lines producing a closed loop in FIG. 2.

Referring further to FIG. 2e, when the first magnetic plates 13b and second magnetic plates 14b are assembled on the rotor 12, the magnetic lines are emitted from the N pole on the inner surface of the first magnetic plate 13b toward the S pole on the inner surface of the neighboring second magnetic plate 14b, and from the N pole on the outer surface of the second magnetic plate 14b to the S pole on the outer surface of the first magnetic plates 13b, forming a closed loop of magnetic lines.

Further referring to FIG. 3, in the Groups A and C of the electromagnetic mutual action components disclosed in FIG. 2, the first wire bundles 13a opposite each other along the direction of their respectively normal lines R can both transmit current in the same direction out of the plane of the paper (in FIG. 3, "•" indicates the current direction); in the Groups B and D of the electromagnetic mutual action component, the second wire bundles 14a opposite each other along the direction of their respective normal lines R can both transmit current in the same direction into the plane of the paper (in FIG. 3, "x" indicates the current direction). Thus, inside the neighboring first wire bundles 13a and second wire bundles 14a, the currents generated are in opposite directions. Based on this structure, the first wire bundle 13a in Group A electromagnetic mutual action component can generate a current in the "•" direction, the corresponding paired first magnetic plates 13b can generate magnetic lines spreading from the N pole on its inner surface toward the S pole on the inner surface of the neighboring second magnetic plate 14b. Based on Ampere right hand rule, the Group A electromagnetic mutual action component can generate a tangential force F1 to cause counter-clockwise rotation, driving the rotor 12 to rotate counter-clockwise. Moreover, the second wire bundles 14a in Group B electromagnetic mutual action component can generate a current in "x" direction, and the paired second magnetic plates 14b corresponding to it can generate magnetic lines converging from the N pole on the inner surface of the first magnetic plate 13b toward the S pole on the inner surface of the second magnetic plates 14b. Similarly, based on Ampere right hand rule, the Group B electromagnetic mutual action component can generate a tangential force F2 to cause counter-clockwise rotation, wherein the tangential forces F1, F2 are equal and can both generate counter-clockwise rotation, so as to simultaneously drive the rotor 12 to rotate counter-clockwise for a specific rotation angle.

Figure 3A:
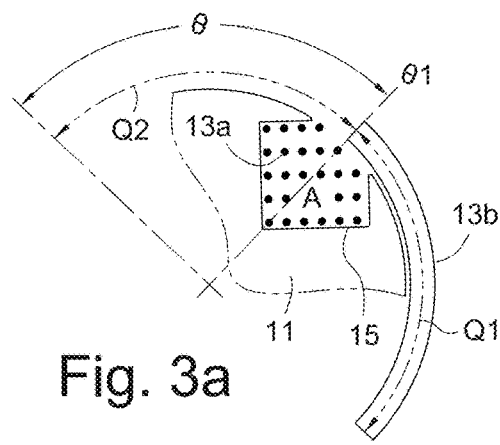
FIG. 3a to FIG. 3e sequentially illustrate the angle positions of the specific rotation angles generated by the magnetic plates in FIG. 3.
Figure 3B:
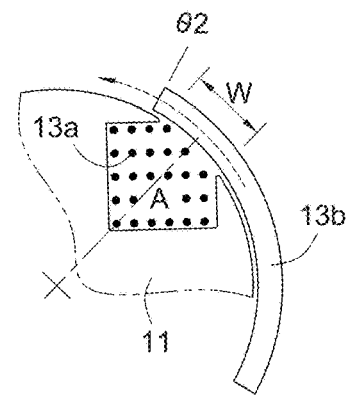
Figure 3C:
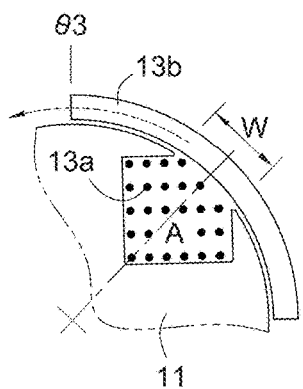
Figure 3D:
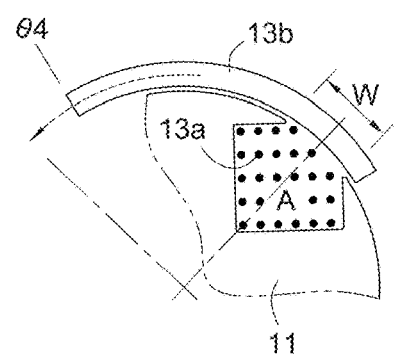
Figure 3E:
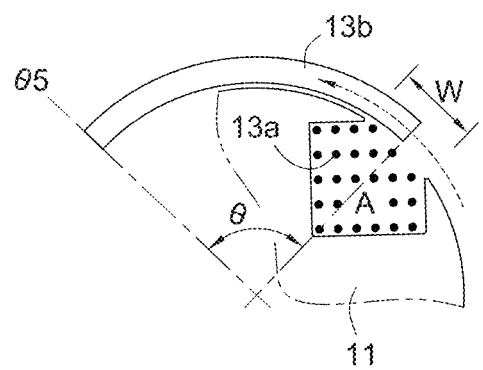

Now, further referring to FIG. 3a, we use the first wire bundles 13a and first magnetic plates 13b in Group A electromagnetic mutual action components as an example. The groove end 15a of each wire collecting groove 15 has a groove end width W. Further, the magnetic plates 13b have a magnetic plate archway length Q1 to spread the magnetic lines. The aforesaid specific rotation angle θ itself has a specific rotation angle archway length Q2. The specific rotation angle θ can be determined by the groove end width W and the magnetic plate archway length Q1. More specifically, in the implementation disclosed in FIG. 1 to FIG. 3f, in expanded linear distance, it can be defined as follows: "the magnetic plate archway length Q1≥specific rotation angle archway length Q2>groove end width W>0". The specific rotation angle archway length Q2 refers to the length of the central arch line of the magnetic plates within the range of a specific rotation angle θ; the groove end width W is the width of its right projection on the central arch line of the magnetic plate. The comparison is made based on the expanded linear distance.

FIG. 3a to FIG. 3e show the sequential change of the rotation angle generated after interaction of the magnetic plates 13b and the current generated by the wire bundles 13a of the present invention. Specifically, in FIG. 3a, the magnetic plates 13b are initially located at a first angle position θ1 before rotation. Then, FIG. 3b to FIG. 3e sequentially show a second angle position θ2 (see FIG. 3b), a third angle position θ3 (see FIG. 3c), a fourth angle position θ4 (see FIG. 3d) and a fifth angle position θ5 (see FIG. 3e) after the rotation caused by the interaction of the magnetic plates 13b and the current generated by the wire bundles 13a. Specifically, the first angle position θ1 (see FIG. 3a) is the starting rotation angle, and the fifth angle position θ5 (see FIG. 3e) is the ending rotation angle.

Figure 3F:
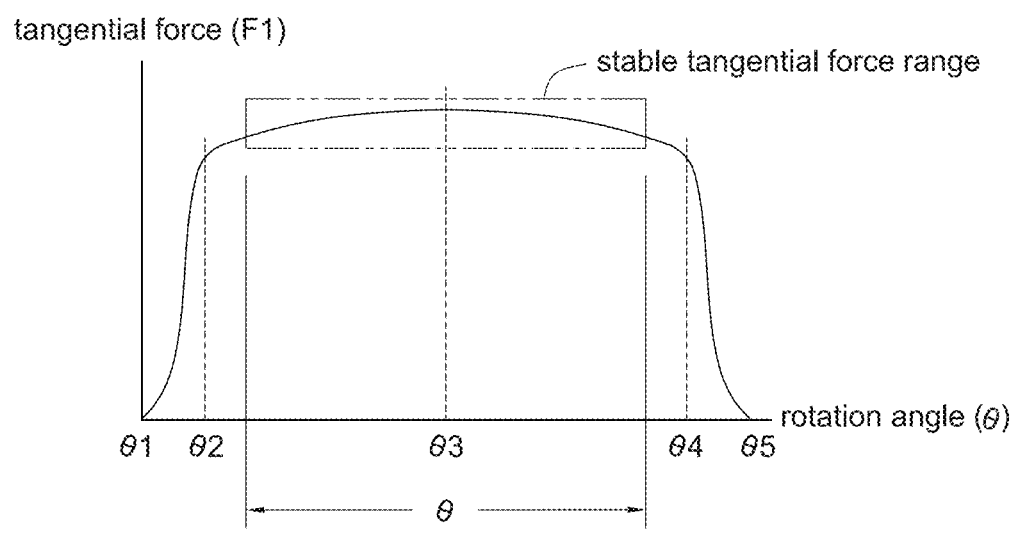
FIG. 3f discloses the curve of the tangential force generated by the magnetic plates in FIG. 3a to FIG. 3e during the rotation.

Further referring to FIG. 3f, during the process from FIG. 3a to FIG. 3e, the magnetic plates 13b rotate from the first angle position θ1 where the tangential force F1 is 0 to the second angle position θ2 where the tangential force F1 drives the rotor 12 to rotate rapidly. Then, when the magnetic plates 13b rotate from the second angle position θ2 to the third angle position θ3, the tangential force F1 will reach the maximum. Then, when the magnetic plates 13b rotate from the third angle position θ3 to the fourth angle position θ4, the tangential force F1 is slightly reduced. When they rotate from the fourth angle position θ4 to the fifth angle position θ5, the tangential force F1 is instantly reduced to 0. Therefore, in the range when the magnetic plates 13b rotate from the second angle position θ2 to the fourth angle position θ4, the magnetic plates 13b can output a stable tangential force F1. Based on this, the present invention can use the rotation angle corresponding to the "stable tangential force range" in FIG. 3f as the above-said specific rotation angle θ of the present invention, to improve the speed and quality of nailing when the nail-shooting rod 20 moves downward for a nailing stroke L (see FIG. 4).

Figure 4:
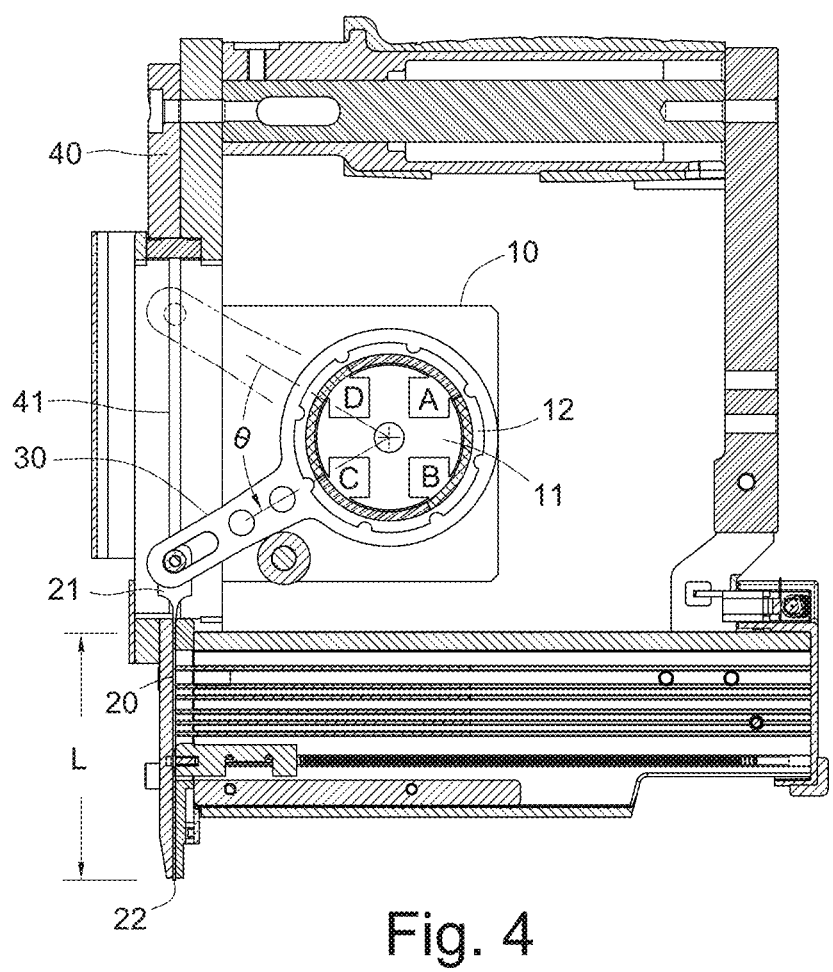
FIG. 4 is a sectional view of the driving device for nailing in FIG. 1 when driving the nail-shooting rod downward for shooting.

Referring collectively to FIG. 1 and FIG. 4, as described above, the magnetic plates 13b, 14b can rotate for a specific rotation angle θ in the same counter-clockwise direction, the rotor 12 in FIG. 1 for fixing the magnetic plates 13b, 14b can also rotate counter-clockwise for the specific rotation angle θ (see FIG. 4). Moreover, as shown in FIG. 1, the rotor 12 is formed with a force output end part 30. Therefore, the rotor 12 can be connected to the transmission part 21 of the nail-shooting rod 20 via the force output end part 30. When the rotor 12 rotates for the specific rotation angle θ, sequentially through the force output end part 30 and the transmission part 21, it can drive the nail-shooting rod 20 to move along the axial direction for a nailing stroke L. Thus, based on the expected nailing stroke L, the present invention can plan a backward specific rotation angle θ and the above characteristics and specifications of the stator 11, rotor 12 and the even numbers of electromagnetic mutual action components 13.

Referring back to FIG. 1, the above force output end part 30 can be implemented as a swing arm 31. More specifically, the two ends of the swing arm 31 are respectively formed with a loop part 31a and a pivoting part 31b. The swing arm 31 can be fixed on the ring-shaped outer wall of the rotor 12 through the loop part 31a. The pivoting part 31b is configured with a stroke hole. Correspondingly, the transmission part 21 of the nail-shooting rod 20 is made with a pivoting hole, so that the pivoting part 31b of the swing arm 31 and the transmission part 21 of the nail-shooting rod 20 can be pivoted through the configuration of a pivot 25. Thus, when the swing arm 31 is driven by the rotor 12 to generate a specific rotation angle θ, the rotational kinetic energy can be converted to linear kinetic energy for the nail-shooting rod 20 to move downward for nailing.

Figure 5:
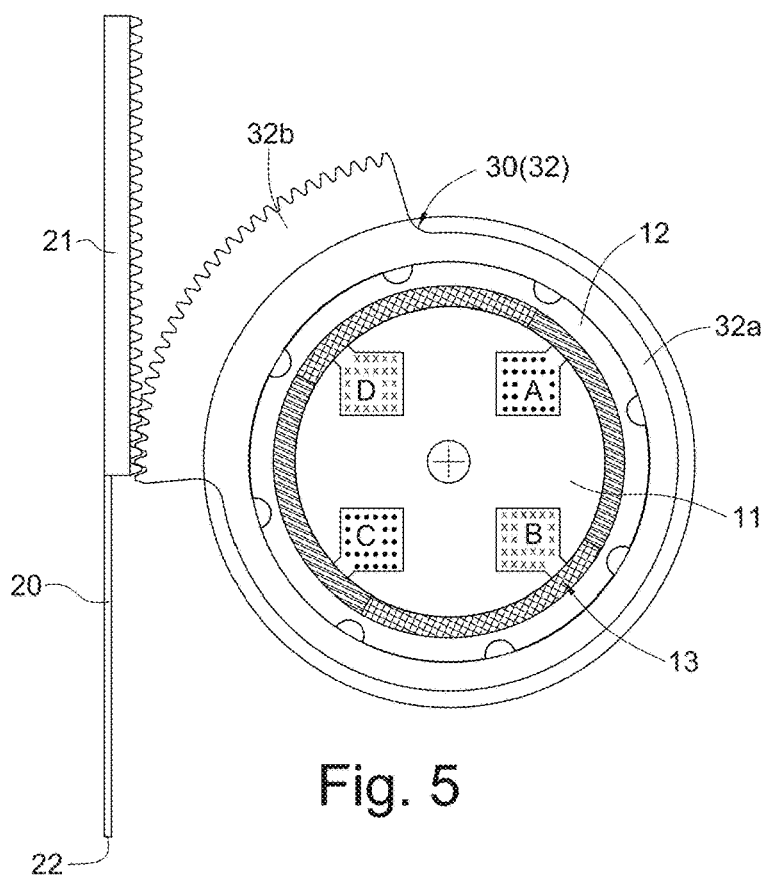
FIG. 5 is a configuration diagram of another embodiment of the driving device for nailing of the present invention.

Further referring to FIG. 5, the above force output end part 30 can be implemented as a scalloped tooth disc 32. More specifically, the two ends of the scalloped tooth disc 32 are respectively formed with a loop part 32a and a tooth part 32b, and accordingly, the transmission part 21 of the nail-shooting rod 20 is formed with racks. The scalloped tooth disc 32 can be fixed on the ring-shaped outer wall of the rotor 12 through the loop part 32a, and the tooth part 32b of the scalloped tooth disc 32 can mesh with the rack (transmission part 21) of the nail-shooting rod 20. Thus, when the scalloped tooth disc 32 is driven by the rotor 12 to generate a specific rotation angle θ, through the engagement between the tooth part 32b and the rack (i.e., the transmission part 21 of the nail-shooting rod 20), the rotational kinetic energy can be converted to linear kinetic energy for the nail-shooting rod 20 to move downward for nailing.

Figure 6:
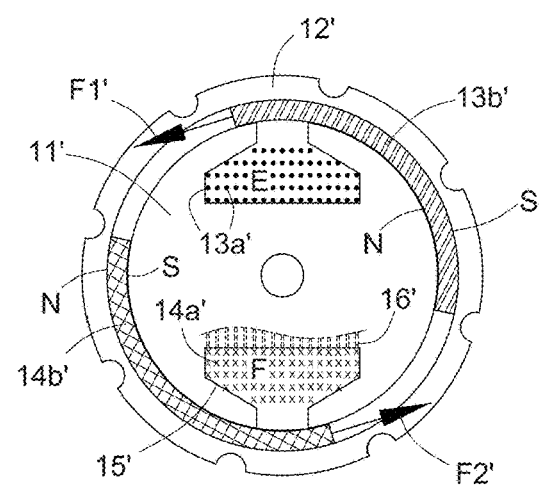
FIG. 6 is a sectional view of another preferred embodiment of the electromagnetic mutual action component of the present invention.

Now, please refer to FIG. 6, which discloses another embodiment of the even numbers of electromagnetic mutual action components. It differs from the embodiment shown in FIG. 1 to FIG. 4 in that:

There are two wire collecting grooves 15' in the present embodiment, opposite each other at a 180-degree angle and configured on the outer wall of the stator 11', adjacent to each other. The even numbers of electromagnetic mutual action component in the present embodiment are two groups: Group E and Group F, wherein Group E electromagnetic mutual action components have paired first wire bundles 13a' and first magnetic plates 13b', Group F electromagnetic mutual action component have paired second wire bundles 14a' and second magnetic plates 14b' (see FIG. 6).

In the present embodiment, the coil 16' is made by winding a single wire between the two wire collecting groove 15' of the stator 11' to form the coil group. The coil 16' structures the first wire bundles 13a' in the Group E electromagnetic mutual action components and the second wire bundles 14a' in Group F electromagnetic mutual action components; wherein, the first wire bundles 13a' can transmit a current in the direction out of the plane of the paper (in FIG. 6, "•" indicates the current direction), and the second wire bundles 14a' can transmit a current in the direction into the plane of the paper (in FIG. 6, "x" indicates the current direction).

Figure 6A:
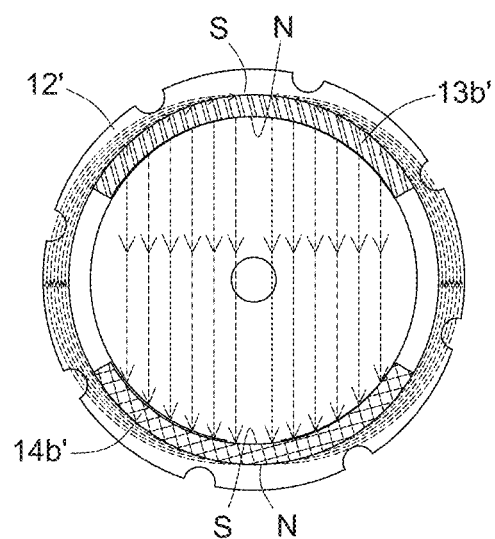
FIG. 6a is a schematic view of the magnetic lines in FIG. 6 generating a closed loop.

In the present embodiment, there are two magnetic plates: first magnetic plate 13b' and second magnetic plate 14b'. Furthermore, as shown in FIG. 6a, the first magnetic plate 13b' has its N pole on the inner surface, and its S pole on the outer surface, so as to provide the first wire bundles 13a' with magnetic lines spreading from the inside of the first magnetic plates 13b' (N pole) toward the inside of the second magnetic plates 14b' (S pole). The second magnetic plate 14b' has its N pole on the outer surface, and its S pole on the inner surface, so as to provide the second wire bundles 14a' with magnetic lines converging from inside of the first magnetic plates 13b' (N pole) toward the inside of the second magnetic plates 14b' (S pole). Thus, the spaced and neighboring first magnetic plate 13b' and second magnetic plate 14b' respectively generate magnetic lines of opposite polarities, thus forming a closed loop of magnetic lines.

Figure 6B:
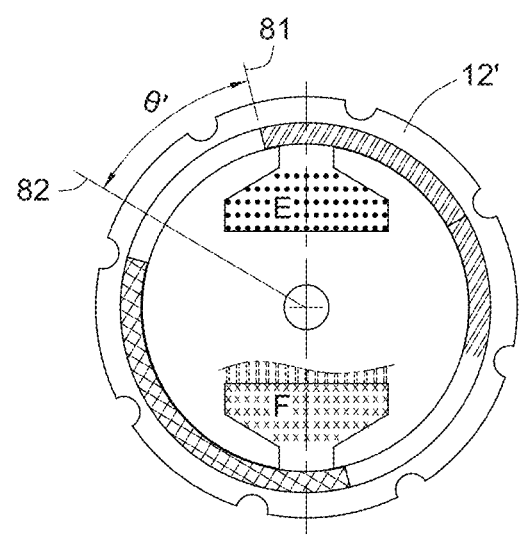
FIG. 6b is a schematic view of the rotor in FIG. 6 that has rotated for a specific rotation angle.

Based on the above configuration and Ampere right hand rule, Group E electromagnetic mutual action components in FIG. 6 can generate a tangential force F1' to cause counter-clockwise rotation, and Group F electromagnetic mutual action components can also generate a tangential force F2' to cause counter-clockwise rotation. Meanwhile, F1'=F2', so that the rotor 12' can be driven to rotate counter-clockwise for a specific rotation angle θ'. The state is shown in FIG. 6b, i.e., the rotor 12' is driven to turn from a starting point 81 toward an ending point 82 for a specific rotation angle θ', so as to generate a forward rotational kinetic energy.

Therefore, the embodiment shown in FIG. 6 can still use the descriptions of different implementations of the force output end part 30 of the embodiments shown in FIGS. 1 and 5, so that, when the rotor 12' turns counter-clockwise and generates a specific rotation angle θ', the above force output end part 30 can convert the rotational kinetic energy into linear kinetic energy for the nail-shooting rod 20 to move downward for nailing.

Based on the above implementation structure of the electric nail gun, the nail drive method of the present invention can be implemented. Now please further refer to FIG. 8a and FIG. 9 collectively. As disclosed in FIG. 8a, inside the rotary actuator 10, a single wire is wound to form a coil group 17 as the control structure during the execution of nailing drive; FIG. 9 further discloses the control process based on the structure shown in FIG. 8a and FIG. 8b.

Figure 8A:
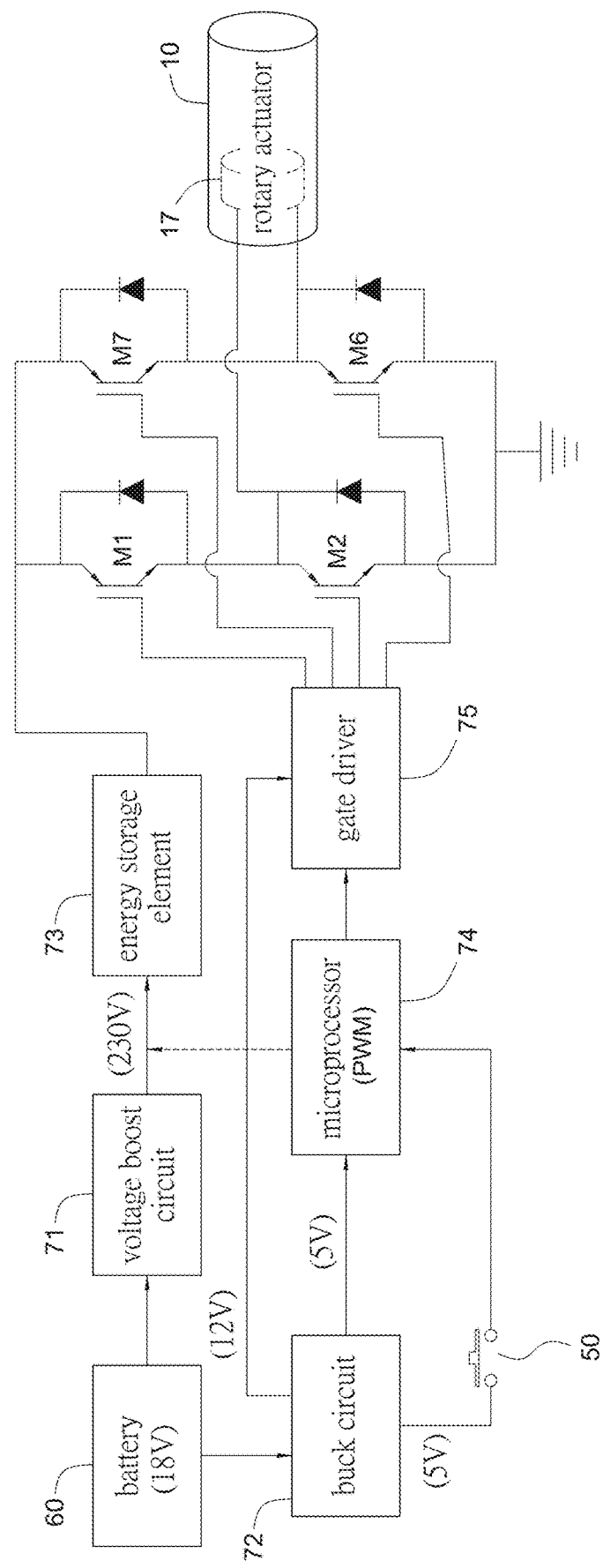
FIG. 8a is a control structure diagram of the present invention, illustrating the use of one single coil group to generate forward and backward rotational kinetic energy.

As shown in FIG. 8a, the coil group 17 can be formed by the wire bundles 13a, 14a disclosed in FIG. 3 or the wire bundles 13a', 14a' disclosed in FIG. 6, and corresponding magnetic plates are provided to form the magnetic lines. Between the battery 60 and the coil group 17 are a voltage boost circuit 71, a buck circuit 72, an energy storage element 73, a microprocessor 74, a gate driver 75 and four insulated gate bipolar transistors M1, M2, M6, M7 (i.e., 4 IGBT) electrically connected to each other. Specifically, the voltage boost circuit 71 is serially connected between the battery 60 and the energy storage element 73, the buck circuit 72 is serially connected between the battery 60 and the microprocessor 74, the buck circuit 72 is serially connected between the battery 60 and the gate driver 75, and the insulated gate bipolar transistors M1, M2, M6, M7 is electrically connected between the energy storage element 73, the gate driver 75 and the coil group 17, to drive and control the rotary actuator 10 to generate forward rotational kinetic energy and backward rotational kinetic energy (to be detailed later). In addition, FIG. 8 also shows that, between the buck circuit 72 and the microprocessor 74, the trigger switch 50 shown in FIG. 1 is serially connected.

Now, please refer collectively to FIG. 8a and FIG. 9. The battery 60 can supply 18 V (Volt) voltage to the voltage boost circuit 71 and the buck circuit 72; the voltage boost circuit 71 can use traditional induction to control the on/off modes of the metal-oxide-semiconductor (MOS) and field-effect transistor (MOSFET) to boost the DC voltage, so that the voltage boost circuit 71 can increase the 18V voltage supplied by the battery 60 to 230V±10V to form the peak voltage; the buck circuit 72 can use traditional switches (such as MOSFET) to segment the DC voltage by time, and use the smoothing method of induction and capacitor to reduce the DC voltage, so that the buck circuit 72 can decrease the 18V voltage supplied by the battery 60 to 5V and 12V standby voltage. Specifically, 5V standby voltage is supplied to the microprocessor 74 and its serially connected component, 12V standby voltage is supplied to the gate driver 75. The energy storage element 73 can be made by electrolytic capacitors of high capacitance, to store the electric charge generated by the peak voltage (230V±10V). The microprocessor 74 detects if the voltage output from the voltage boost circuit 71 meets the preset standard for peak voltage (230V±10V). Furthermore, the microprocessor 74 is configured with a pulse wave width modulator (PWM) to control the switch time of the insulated gate bipolar transistors M1, M2, M6, M7, to transmit the peak current generated by the peak voltage releasing electric charge to the wire bundles 13a, 14a (see FIG. 3) or wire bundles 13a', 14a' (see FIG. 6) of the coil group 17, and to generate forward rotational kinetic energy and backward rotational kinetic energy (to be detailed later).

More specifically, when pressed by the finger of the user, the trigger switch 50 can trigger a nailing signal. The present invention uses the nailing signal to control the timing for the peak voltage and its electric charge to be released to the rotary actuator 10; more specifically, once the user triggers the nailing signal, through the detection of the microprocessor 74, the microprocessor 74 will control the gate driver 75 to connect the insulated gate bipolar transistors M1 and M6, so that the energy storage element 73 can release sufficient peak voltage (230V±10V) and its electric charge to the wire bundles 13a, 14a (or the wire bundles 13a', 14a') to generate the peak current, which interact with the magnetic lines to generate the tangential force F1, F2 (or tangential force F1', F2') to drive the magnetic lines to rotate the rotor 12 (or rotor 12') for a specific rotation angle θ (or θ'), and further drive the rotary actuator 10 to generate forward rotational kinetic energy, and drive the nail-shooting rod 20 to move downward for nailing. Specifically, the tangential force F1, F2 (or tangential force F1', F2') are represented by Eq. (1) according to Ampere's law:

$$F = B \times L \times I \qquad \text{Eq. (1)}$$

In Eq. (1), F is the tangential force, B is the magnetic flux density of the magnetic lines, L is the total length of the serially connected wire, I is the current generated by the total electric charge released by the peak voltage during the nailing action time to the wire bundles.

Furthermore, according to Faraday's Law, when the peak current generated by the wire bundles 13a, 14a (or the wire bundles 13a', 14a') and the magnetic lines generated by the magnetic plates 13b, 14b (or magnetic plates 13b', 14b') interact to cause the rotor 12 (or rotor 12') to rotate, the magnetic field will move along, and the magnetic field will cut the wire bundles on the stator 11 (or stator 11') to produce an back electromotive force; the higher the rotational speed of the rotor 12 (or rotor 12') is, the larger the back electromotive force will be. The back electromotive force is represented by the following Eq. (2):

$$V = B \times L \times v \qquad \text{Eq. (2)}$$

In Eq. (2), V is the back electromotive force, B is the magnetic flux density of the magnetic lines, L is the total length of the serially connected wire, v is the speed caused by the tangential force F.

In the present invention, the peak voltage must overcome the above back electromotive force and basic voltage to successfully generate the tangential force F for nailing. Therefore, the peak voltage must satisfy the Eq. (3):

$$V_{max} > (V_s + V_c) \qquad \text{Eq. (3)}$$

In Eq. (3), $V_{max}$ is the peak voltage, $V_s$ is the basic voltage required for the energy storage element to release electric charge during the power-on time, $V_c$ is the terminal voltage; wherein, $$V_c > V_b + I_e R \qquad \text{Eq. (4)}$$

In Eq. (4), $V_b$ is the back electromotive force generated by the wire bundles caused by the rotation of the magnetic lines, $I_e$ is terminal current, R is terminal resistance generated by the wire bundles.

Figure 10:
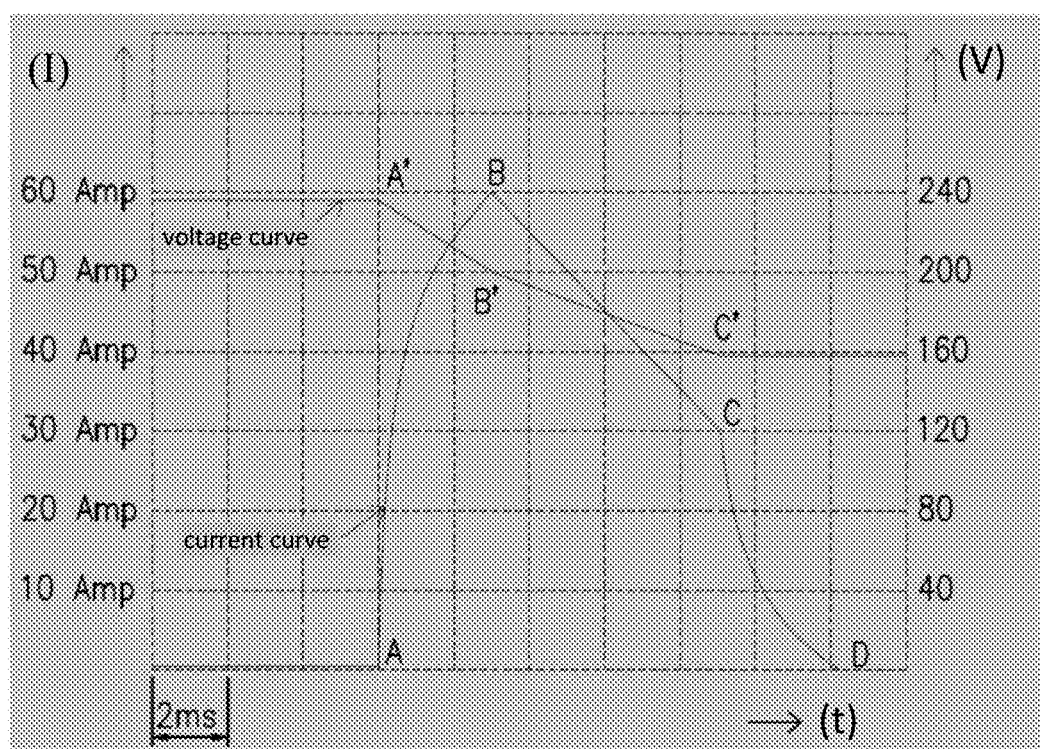
FIG. 10 is a schematic view of the voltage curve and current curve in FIG. 9.

It is to be noted that, the peak voltage releasing process has a nailing action time to drive the nail-shooting rod 20 to move downward for nailing. The current generated by the peak voltage and its electric charge will have a change during the nailing action time, as shown in FIG. 10, and the peak voltage at the end of the nailing action time has a terminal voltage. The terminal voltage and the terminal current it generates must satisfy Eq. (5):

$$\frac{(V_c - V_e)}{R} > I_e > 0 \qquad \text{Eq. (5)}$$

In Eq. (5), $V_c$ is the terminal voltage, $V_e$ is the back electromotive force generated by the wire bundles under the effect of rotation of the magnetic lines at the end of the nailing action time, $I_e$ is the terminal current, R is terminal resistance generated by the wire bundle.

The forward rotational kinetic energy is obtained from computing Eq. (6):

$$E = \frac{1}{2} J \omega^2 \qquad \text{Eq. (6)}$$

In Eq. (6), E is the forward rotational kinetic energy, J is the moment of inertia generated by the rotor, ω is angular speed generated by the rotor.

More specifically, FIG. 10 discloses a voltage curve, in which the peak voltage (230V±10V) is at A' point before the energy storage element 73 releases electric charge to the wire bundles. With the lapse of the nailing action time, the peak voltage will gradually descend from A' point to C' point. C' point is the terminal voltage (about 160V) of the energy storage element 73 after the nail-shooting rod to moves downward for nailing. The transition time from A' point to C' point is 9 ms (millisecond). This 9 ms is the power-on time; wherein, the transition time from B' point to C' point is 6 ms. This 6 ms is the nailing action time.

FIG. 10 also discloses a current curve, wherein A point is the initial current generated after the energy storage element 73 releases the peak voltage. When the initial current at A point enters the wire bundles, the induction generated on the wire bundles of the stator will affect the rising of initial current at A point. Therefore, during the above 9 ms of the power-on time, the present invention intentionally plan the pulse wave width modulator (PWM) configured in the microprocessor 74 with a time of 3 ms first, so that the initial current at A point can rise to B point along a slight curve, to become a peak current of 60 Ampere (Amp). Then, the pulse wave width modulator (PWM) is planed with a time of 6 ms, so that the 60 Amp peak current at B point will be lowered to C point and become a 30 Amp terminal current. Then, at C point, the power supply of the nail gun can be disconnected to let the induction of the wire release energy, and cause the current to be lowered from C point to D point, and then gradually to zero. From FIG. 10, it is concluded that, along with the aggregation of the nailing action time, the initial current (i.e., A point current) will firstly rise and then descend to the terminal current (i.e., C point current), so as to overcome the impact of the induction. Thus, during the releasing process, the peak voltage and the current it generates can produce sufficient kinetic energy to drive the nail-shooting rod to move downward for nailing, ensuring the quality of the nails pressing into the work piece.

To prove the feasibility of the above technique, the present invention has planed and arranged the required parameters according to the basic requirements for an ordinary nail gun to reach a sufficiently high linear speed when driving the nail-shooting rod to move downward for nailing, which are listed in the following Table 1

TABLE 1

Nailing parameters preset by the present invention

| Parameter name | Parameter |
|---|---|
| Energy consumption for each nail to be shot into oak wood (nail type: 23 gauge, length 35 mm) | 8 Joule |
| Nail-shooting rod stroke | 62.8 mm |
| Ending speed requirement of the nail-shooting rod (under zero load without nailing) | 40 m/sec |
| Nail-shooting rod starting force requirement | 20 kgf |
| Nail-shooting rod ending force requirement | 10 kgf |

Based on the above nailing parameters, the present invention designed a nail drive structure as shown in FIG. 1 to FIG. 7; here, the present invention uses the nail drive structure disclosed in FIG. 1 to FIG. 4 as an example to make further plans and arrangements for the nailing parameters of the rotary actuator 10, as shown in the following Table 2:

TABLE 2

Nailing parameters planned for the rotary actuator

| Parameter name | Parameter |
|---|---|
| Lever ratio of the force output end part (swing arm) | 3:1 |
| Average distance of the rotation centers of the nail-shooting rod and the rotary actuator | 60 mm |
| Rotor air gap (between the wire bundles and the magnetic plates) diameter r | 0.02 m |
| Rotor ending speed ω (under zero load without nailing) | 666.67 rad/sec (6369 rpm) |
| Steel plate stack thickness of the stator | 30 mm |
| Power-on time | 9 ms |
| Nailing action time | 9 − 3 = 6 ms (current rises during first 3 ms) |
| Wire bundle distribution of the rotary actuator | 4 poles × 4 grooves |
| Maximum swing stroke of the rotary actuator (theoretical) | 90° |
| Effective swing stroke of the rotary actuator | 80° |
| Swing stroke actually used by the rotary actuator | 60° |
| magnetic flux density B of the magnetic lines | 0.9 Tesla |
| Peak voltage setting | 230 V ± 10 V |
| Terminal voltage setting | 160 V |
| Peak current setting | 60 Amp |
| Terminal current setting | 30 Amp |

Table 1 and Table 2 show that the nail-shooting rod starting force requirement is 20 kgf, and the nail-shooting rod ending force requirement is 10 kgf. The tangential force parameters required for the rotary actuator can be obtained by multiplying the above two respectively with the lever ratio 3 of the force output end part (swing arm). The result is shown in the following Table 3:

TABLE 3

Parameters of the tangential force generated by the rotary actuator

| Parameter name | Parameter |
|---|---|
| Starting tangential force generated by the rotary actuator | 20 × 3 = 60 kgf |
| Ending tangential force generated by the rotary actuator | 10 × 3 = 30 kgf |
| Average tangential force generated by the rotary actuator | [(20 + 10)/2] × 3 = 45 kgf = 441N |

As the starting tangential force generated by the rotary actuator is 60 kgf, the tangential force F=60×9.8=588 N (Newton) in Eq. (1) can be obtained according to F=mg. Then, based on the magnetic flux density and the parameter of the peak current disclosed in Table 2, when taken into the Ampere's law in Eq. (1), by calculation, it is known that the total length of the serially connected wire L=588/(0.9×60) =10.8 m (meter). Thus, the parameters in Table 4 are designed:

TABLE 4

Parameters of the stator and wire bundles of the rotary actuator

| Parameter name | Parameter |
|---|---|
| Stator stack | 30 mm = 0.03 m |
| Wire turning rounds of the wire bundles | 45 rounds |
| Terminal resistance generated by the wire bundles | About 0.7 Ω |

By multiplying the rotor ending rotational speed disclosed in Table 2 by the rotor air gap diameter, the final speed v=0.02×666.67=13.33 m/sec generated by the tangential force F can be obtained. When taken into the Faraday's Law in Eq. (2), the back electromotive force $V_e$=0.9×10.8× 13.33=129.58 V (Volt) at the end of the nailing stroke can be obtained, indicating the wire winding rounds of the wire bundles shall be configured as 45 rounds as shown in Table 4. When the terminal resistance generated by the wire bundles is 0.7Ω (Ohm), at the end of the nailing stroke, the back electromotive force V=129.58 V (Volt). Here, it is to be noted that the above final speed is under the condition of zero load without nailing. If it is under the loaded condition for nailing, the final speed will be less than the values listed above (i.e., v<13.33 m/sec).

During the nailing action time, to make sure that, at the end of nailing, the nail-shooting rod still has sufficient force to press the nail, the terminal voltage $V_c$ remained after the energy storage element 73 releases the peak voltage must satisfy the above Eq. (4). This can be obtained by taking the above parameters into Eq. (4): $V_c$=129.58+(30×0.7)= 150.58. However, according to Table 2, the terminal voltage planned by the present invention is 160. Therefore, 160>150.58, which satisfies Eq. (4). Based on this, it is also proved that the terminal current $I_e$ must at least be maintained at 30 Amp.

Moreover, according to Eq. (3), because the peak voltage $V_{max}$ of the present invention must overcome the total of the basic voltage $V_s$ and the terminal voltage $V_c$ to successfully generate the tangential force F sufficient for nailing. In FIG. 10, the area enclosed by the current curve and the time axis represents the total electric charge released by the energy storage element during the power-on time, which is about 0.315 Coulomb. If the energy storage element is a 0.004 F capacitor, the total voltage obtained by adding the basic voltage $V_s$=0.315/0.004=78.75V to the terminal voltage 150.58V is 229.33V. According to Ohm Law V=IR, to generate a 60 A current, the wire bundles only need a ΔV=60×0.7=42V. It is proved that, when the peak voltage is set at 230V±10V, through PWM technology, a 60 A peak current can be generated, so as to generate a 588 N tangential force F.

Then, according to Tables 2 and 3, the rotor air gap diameter is 0.02 m, the rotor ending speed ω is 666.67 rad/sec, the nailing action time Δt is 6 ms, and the average tangential force generated by the rotary actuator is 441 N (Newton). Based on this, by calculation we can obtain the torque generated by the rotary actuator T=F×r=441×0.02=8.82 Nm (Newton meter), the angular acceleration α=ω/Δt=111111.67 rad/sec² of the rotary actuator, and the moment of inertia J=T/α=0.0000794 Kgm·m² of the transmission structure of the rotor and the nail-shooting rod in relation to the rotation center. By further substituting into Eq. (5), we can obtain the forward rotational kinetic energy E=0.0000794×666.67²/2=17.6446209 J (Joules), which is much larger than the 8 Joule energy consumption of pressing one single nail into the oak wood as planned in Table 1. Therefore, the forward rotational kinetic energy E can meet the standard required to drive the nail-shooting rod to move downward for nailing.

Secondly, regarding the action of driving the nail-shooting rod to move upward to be reset according to the invention, please refer to FIG. 8a again. When the nail-shooting rod 20 moves downward for nailing, the energy storage element 73 that has released peak voltage still has a terminal voltage (around 160V), which can drive the rotary actuator 10 to generate backward rotational kinetic energy via the connected insulated gate bipolar transistors M2 and M7, driving the nail-shooting rod 20 to move instantly upward to be reset after nailing. In addition, when the nail-shooting rod 20 moves downward for nailing, the gate driver 75 can connect the insulated gate bipolar transistors M2 and M7 through the 12V voltage provided by the buck circuit 72, and drive the rotary actuator 10 to generate backward rotational kinetic energy. It must be noted that, in the present embodiment, when the gate driver 75 connects the insulated gate bipolar transistors M2 and M7 to drive the nail-shooting rod 20 to move upward to be reset, the insulated gate bipolar transistors M2 and M7 will provide backward current to the coil 16 and 16' shown in FIG. 2 and FIG. 6, so as to generate backward rotational kinetic energy to drive the nail-shooting rod 20 to move upward to be reset.

Figure 8B:
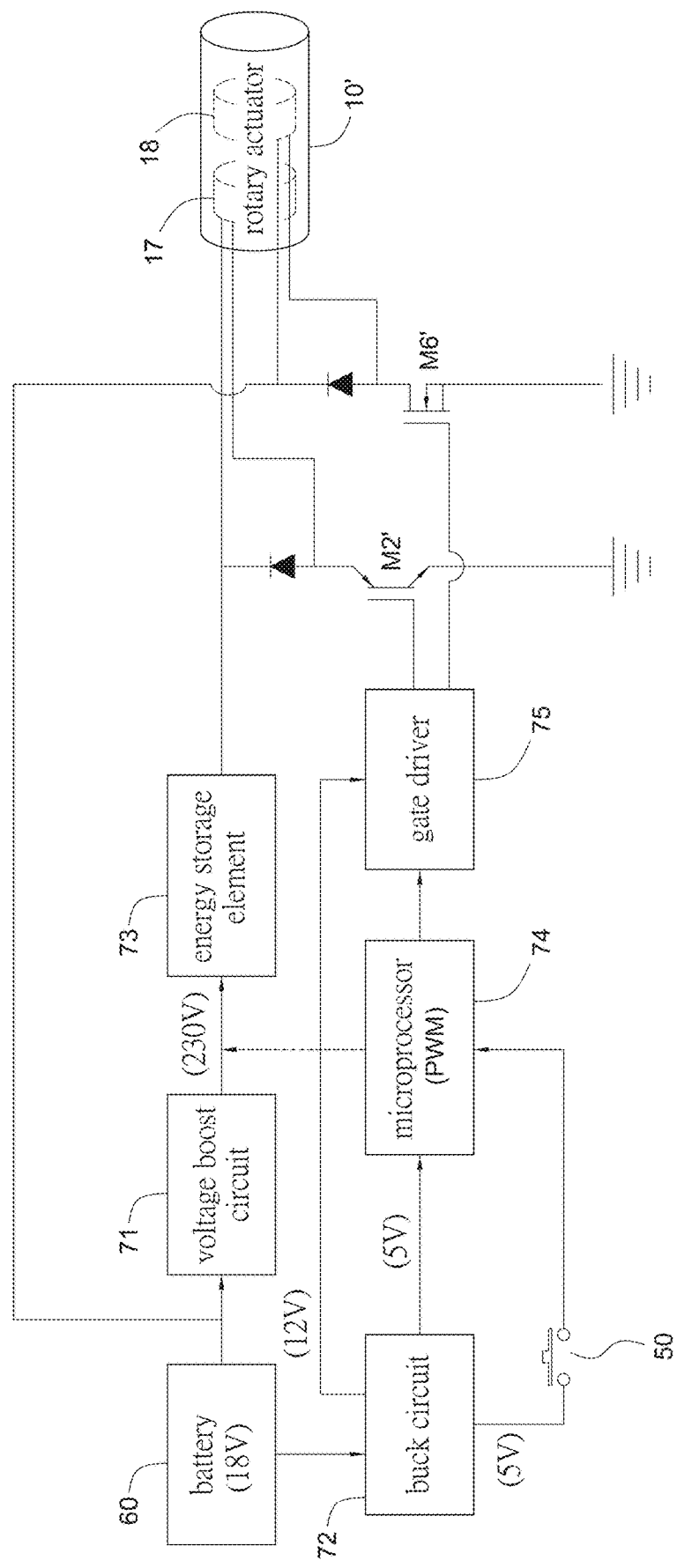
FIG. 8b is another control structure diagram of the present invention, illustrating the use of two coil groups to generate forward and backward rotational kinetic energy.
Figure 9:
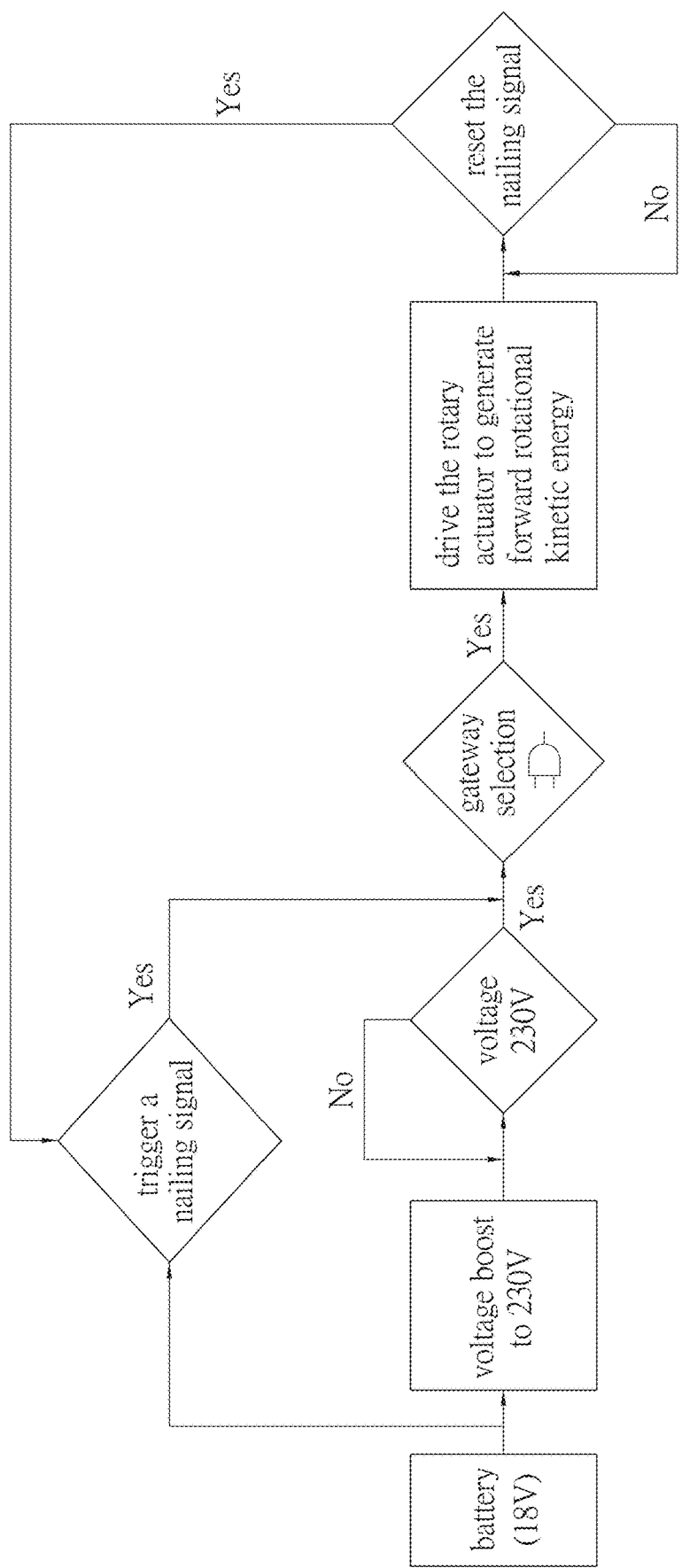
FIG. 9 is a control process chart of the present invention showing the nail-shooting rod is driven to move downward for nailing.

Moreover, referring to the implementation structure shown in FIG. 8b, which is different from that disclosed in FIG. 8a. Specifically, FIG. 8b discloses a nail drive control structure made by winding two wires inside the rotary actuator 10' to form two coil groups 17, 18.

More specifically, the embodiment shown in FIG. 8b differs from the embodiment in FIG. 8a in that, the coil group 17, 18 can respectively be formed by the wire bundles 13a, 14a shown in FIG. 3 or the wire bundles 13a', 14a' shown in FIG. 6. The coil group 17 is specially used to output forward rotational kinetic energy, and the coil group 18 is specially used to output backward rotational kinetic energy. Specifically, the coil group 18 can also be formed by winding one single wire bundle of a conventional motor, and the coil groups 17, 18 can be both wound on a single stator 11 (or 11'), or respectively on two stators to match the corresponding magnetic plates to form the magnetic lines. Moreover, in FIG. 8b, the gate driver 75, the energy storage element 73 and the coil group 17 is electrically connected to the bipolar transistor M2' of the insulated gate (IGBT). The battery 60, the gate driver 75 and the coil group 18 are electrically connected to a metal-oxide-semiconductor field-effect transistor M6' (MOSFET), wherein, the insulated gate bipolar transistors M2' (IGBT) and the metal-oxide-semiconductor field-effect transistor M6' (MOSFET) are both power switches. Therefore, in the present embodiment, only the two power switches (i.e., MT, M6') are used. In addition, other implementation structures in FIG. 8b are same as FIG. 8a.

Further, the control details of the structure in FIG. 8b differs from the structure in FIG. 8a in that, the pulse wave width modulator (PWM) in the microprocessor 74 only controls the timing to turn on/off the insulated gate bipolar transistors MT, transmitting the peak current generated by the peak voltage releasing electric charge to the wire bundles 13a, 14a (see FIG. 3) or wire bundles 13a', 14a' (see FIG. 6) of the coil group 17, so as to generate forward rotational kinetic energy. Because the metal-oxide-semiconductor field-effect transistor M6' is electrically connected to the battery 60, after the nail-shooting rod 20 moves downward for nailing, the microprocessor 74 will detect the end of the nailing action time, and the gate driver 75 can disconnect the insulated gate bipolar transistors M2' (IGBT), and meanwhile connect the metal-oxide-semiconductor field-effect transistor M6' (MOSFET). Then, the metal-oxide-semiconductor field-effect transistor M6' will use the 18V stand-by power source of the battery 60 to supply backward current to the coil group 18, so as to generate backward rotational kinetic energy for the nail-shooting rod 20 to move upward to be reset.

Figure 7:
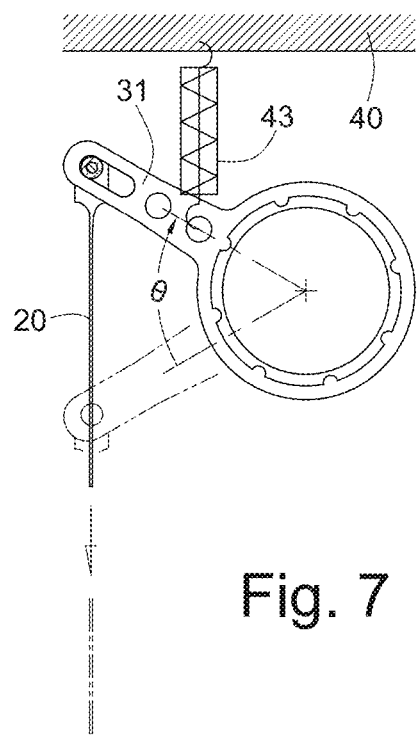
FIG. 7 is an embodiment configuration diagram of the present invention driving the nail-shooting rod to move upward to be reset.

As described above, because the backward rotational kinetic energy required by the nail-shooting rod 20 to move upward to be reset is far less than the forward rotational kinetic energy required for the nail-shooting rod 20 to move downward for nailing, in the present invention, the backward rotational kinetic energy can be achieved by the aforesaid embodiment shown in FIG. 8a or FIG. 8b. Moreover, as shown in FIG. 7, when the reset spring 43 is pulled when the nail-shooting rod 20 moves downward for nailing and accumulates an elastic force, it can drive the nail-shooting rod 20 to move upward to be reset, and drive the rotor (12 or 12') to close the specific rotation angle θ. This effect is equal to the above backward rotational kinetic energy, and can drive the nail-shooting rod 20 to move upward to be reset without using the rotary actuator 10 or 10'. Therefore, this is also an option to be implemented by the present invention. Specifically, the reset spring 43 can be an extension spring, a compression spring, a torque spring or any other elastic objects.

Although the invention has been explained in relation to its preferred embodiment, it is to be understood that many other possible modifications and variations can be made without departing from the spirit and scope of the invention as hereinafter claimed.

The invention claimed is:

1. A drive method for nailing of electric nail gun, used for driving a rotary actuator to generate forward rotational kinetic energy for nailing, wherein the rotary actuator has paired wire bundles and magnetic lines arranged in circumferential direction, and the drive method comprises:

boosting a voltage of a battery to generate a peak voltage, and storing an electric charge generated by the peak voltage, and then releasing the peak voltage and the electric charge to the rotary actuator through a nailing signal, so that the paired wire bundles generate a current to interact with the magnetic lines to generate a tangential force to drive the magnetic lines to rotate for a specific angle and generate forward rotational kinetic energy; specifically, the peak voltage satisfying the following inequation:

$$V_{max} > (V_s + V_c)$$

where, $V_{max}$ is the peak voltage, $V_s$ is basic voltage necessary for an energy storage element to release electric charge during a power-on time, and $V_c$ is terminal voltage.

2. The drive method for nailing of electric nail gun as claimed in claim 1, wherein the terminal voltage $V_c$ satisfies the following inequation:

$$V_c > V_b + I_e R$$

where, $V_b$ is a back electromotive force generated by the wire bundles rotated by the magnetic lines, $I_e$ is a terminal current in the wire bundles at an end of the nailing action time, and R is a terminal resistance generated by the wire bundles.

3. The drive method for nailing of electric nail gun as claimed in claim 1, wherein the rotary actuator comprises a fixed stator and a rotor pivoted around the fixed stator, the wire bundle is made by winding a wire serially around the stator, the magnetic line bundle is produced by a pair of magnetic plates, the pair of magnetic plates are fixed on an inner wall of the rotor, and the magnetic line bundle is rotated by the rotor for a specific rotation angle.

4. The drive method for nailing of electric nail gun as claimed in claim 2, wherein the tangential force is represented by the following Eq. (1), a back electromotive force is represented by Eq. (2), and the forward rotational kinetic energy is represented by Eq. (3):

$$F = B \times L \times I \quad (1)$$

$$V = B \times L \times v \quad (2)$$

$$E = \frac{1}{2} J \omega^2 \quad (3)$$

where, F is the tangential force, B is magnetic flux density of the magnetic lines, L is the total length of a serially connected wire, I is the current generated by a total electric charge released by the peak voltage to the wire bundles during a nailing action time, V is the back electromotive force, v is a speed generated by F, E is the forward rotational kinetic energy, J is a moment of inertia generated by the rotor, ω is a angular speed generated by the rotor.

5. The drive method for nailing of electric nail gun as claimed in claim 1, wherein a peak voltage releasing process has a nailing action time, the current has an initial current at an initial stage of a nailing action time, the current has a terminal current at an end of the nailing action time, the initial current is firstly increased and then decreased to the terminal current along with a progress of the nailing action time.

6. The drive method for nailing of electric nail gun as claimed in claim 1, wherein the battery is electrically connected to an energy storage element via a voltage boost circuit, the peak voltage is generated by the voltage boost circuit, and the electric charge that generates the peak voltage is stored by the energy storage element, the nailing signal is generated by a trigger switch that actuates the electric nail gun, the trigger switch controls a timing for the peak voltage and the electric charge to be released to the rotary actuator via the energy storage element.

7. The drive method for nailing of electric nail gun as claimed in claim 5, wherein the peak voltage has a terminal voltage at an end of the nailing action time, the terminal voltage and the terminal current satisfies the following inequation:

$$\frac{(V_c - V_e)}{R} > I_e > 0$$

wherein, $V_c$ is the terminal voltage, $V_e$ is back electromotive force at the end of the nailing action time, $I_e$ is the terminal current, R is terminal resistance generated by the wire bundles.

8. The drive method for nailing of electric nail gun as claimed in claim 7, which further comprises providing a backward current by the terminal voltage to drive the rotary actuator to produce a backward rotational kinetic energy after generating the forward rotational kinetic energy.

9. The drive method for nailing of electric nail gun as claimed in claim 1, which further comprises providing a backward current by the battery to drive the rotary actuator to generate a backward rotational kinetic energy after generating the forward rotational kinetic energy.

10. The drive method for nailing of electric nail gun as claimed in claim 1, which further comprises closing a specific rotation angle by a potential energy generated by a reset spring after generating the forward rotational kinetic energy.

* * * * *